R. N. ALLEN AND J. N. TODD.
TRUCK.
APPLICATION FILED DEC. 29, 1920.
1,437,212.
Patented Nov. 28, 1922.
2 SHEETS—SHEET 2.
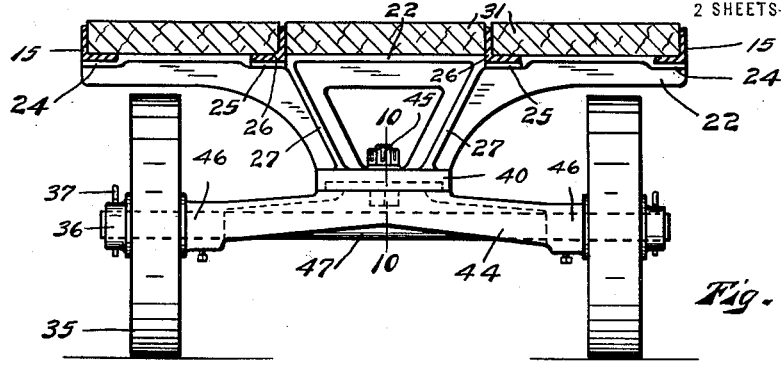
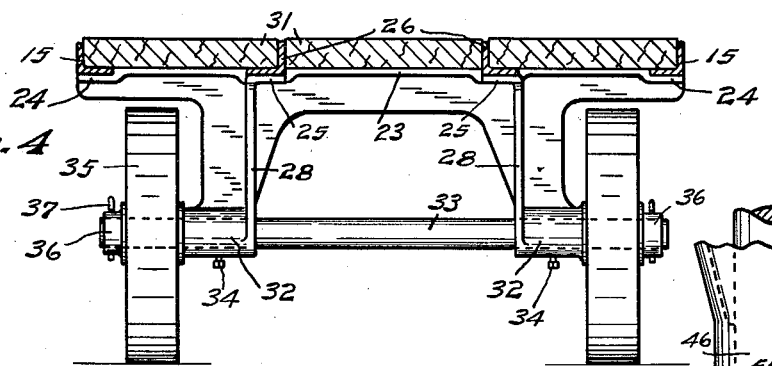
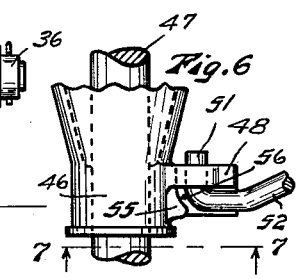
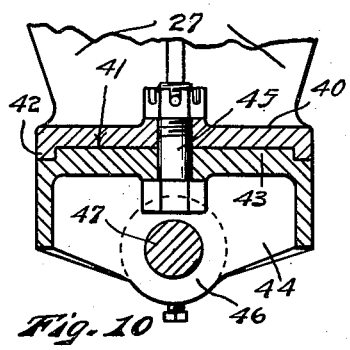
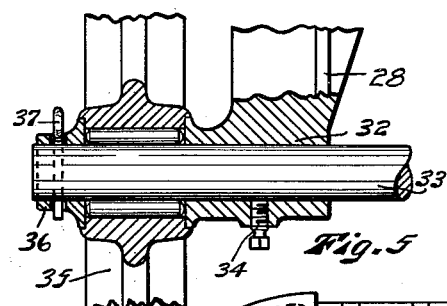
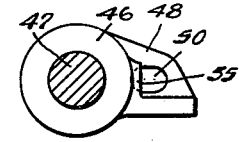
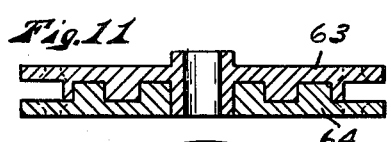
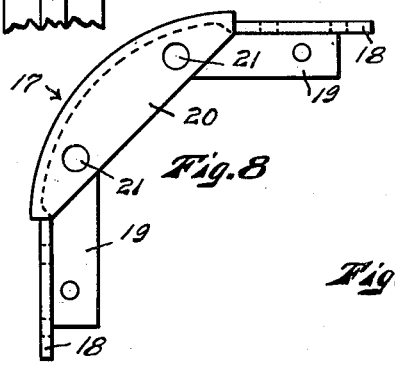
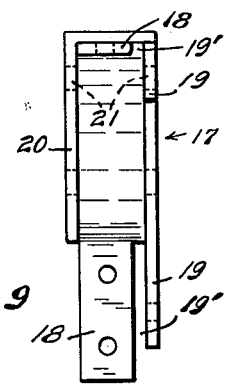
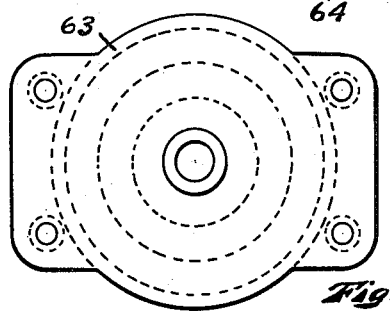
Inventors
Roy N. Allen
John N. Todd
Attorney Fred C. Matheny Patented Nov. 28, 1922.

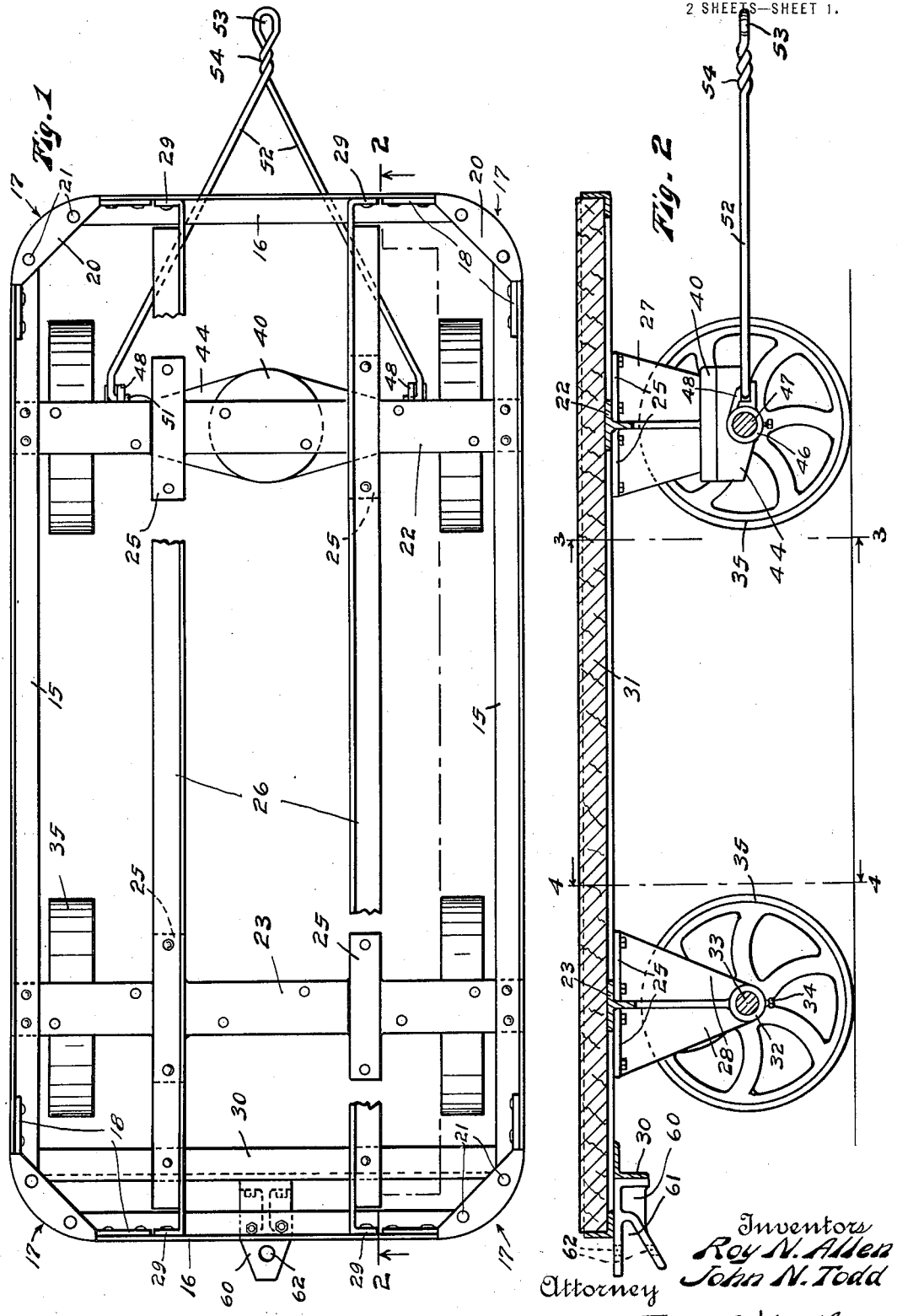

1,437,212

UNITED STATES PATENT OFFICE.

ROY N. ALLEN AND JOHN N. TODD, OF SEATTLE, WASHINGTON.

TRUCK.

Application filed December 29, 1920. Serial No. 433,908.

*To all whom it may concern:*

Be it known that we, ROY N. ALLEN and JOHN N. TODD, citizens of the United States, residing at Seattle, in the county of King and State of Washington, have invented a certain new and useful Improvement in Trucks, of which the following is a specification.

This invention relates to improvements in trucks of the class commonly used as trailer vehicles in warehouses, yards and like places for transporting various material, and in a general way the object of this improvement is to provide a truck that is strong and simple in construction, that is made up of comparatively few parts which are easily assembled or disassembled and that is not expensive to manufacture.

More specific objects are:

To provide a truck having a novel type of fifth wheel in which the greater portion of the shear and strain is borne by concentrically arranged interfitting grooves and flanges instead of being borne by the king pin thus affording a stronger construction and at the same time permitting the use of a much smaller king pin.

To provide a truck having the front bolster and the upper half of the fifth wheel constructed in one piece and having the lower portion of the fifth wheel integral with an axle truss or housing for the front axle the said axle housing also serving as a thrust bearing for the front wheels, and having integral lugs that are perforated for the reception of the ends of a tongue of novel construction and that have means for preventing the disengagement of the ends of said tongue.

To provide a truck having axle supports constructed in such a manner that ordinary straight shafting either hollow or solid may be used for axles without forging or machining, the only work that is necessary in making the axle being to cut the shafting the proper length and drill a transverse hole near each end thereof the holes being outside of the wheels and in portions of the axles that are not subjected to stresses and the axles being held in such a manner that they may be rotated about their axes so as to present a new wearing surface if such axles become worn.

To provide a truck having both front and rear axle bolsters that are constructed in the form of a truss that serves to transfer the weight of the load to the axles at points near the wheels thereby relieving the axles of bending strain.

To provide a novel frame made up of straight sections of angle iron secured to the bolsters in such a manner that the upper surface of the horizontal flange of the angle iron is flush with the top surface of the bolster so that deck planking may rest evenly and uniformly on the angle iron and bolsters and to further provide a frame in which the corners are formed of separate corner pieces that are rigidly secured to the side and end bars of the frame and that have stake receiving pockets provided therein, the said frame and bolsters forming a strong and rigid structure that obviates the use of a reach rod of the usual form.

In the accompanying drawings Figure 1 is a plan view of a truck constructed in accordance with this invention the deck planks being removed and certain parts of the frame being broken away. Fig. 2 is a view in longitudinal section substantially on broken line 2, 2 of Fig. 1 showing the deck planks on the frame. Figs. 3 and 4 are views in cross section on broken lines 3, 3 and 4, 4 respectively of Fig. 2 showing parts of the truck in elevation. Fig. 5 is an enlarged fragmentary view partly in section and partly in elevation showing the end of the truck axle and the thrust bearing for the truck wheel that is formed by the truck bolster. Fig. 6 is an enlarged fragmentary plan view showing the manner of fastening the tongue to the front bolster housing. Fig. 7 is a view partly in section and partly in elevation on broken line 7, 7 of Fig. 6 showing the tongue receiving bracket with the tongue removed. Fig. 8 is a detached plan view of a corner bracket for the frame. Fig. 9 is a view in elevation of the same. Fig. 10 is an enlarged sectional view on broken line 10, 10 of Fig. 3 showing the fifth wheel structure. Fig. 11 is a view in cross section showing a modified form of fifth wheel structure and Fig. 12 is a plan view of the device shown in Fig. 11.

Like reference numerals designate like parts throughout the several views.

Referring to the drawings we have shown a truck comprising a rectangular frame made up of side members 15 and end members 16, preferably angle bars, that are rigidly secured together by corner brackets 17. The corner brackets 17, which are each cast in a single piece, have vertical plates 18 and horizontal plates 19 that are spaced apart as at 19', see Figs. 8 and 9, so that the vertical flanges of the angle bars may be secured to the outer sides of the vertical plates 18 and the horizontal flanges of such angle bars may project through the spaces 19' and rest upon and be secured to the horizontal plates 19, thereby affording an exceptionally strong and rigid corner construction. The corner brackets 17 have angular corner plates or braces 20 that render them strong and rigid. The angular corner plates 20 and the lower horizontal plates 19 are provided with holes 21 for the reception of corner stakes, not shown.

The frame is supported on front and rear bolsters 22 and 23 respectively that are each recessed or notched at their outer ends as at 24 to afford seats for the side angle bars 15 of the frame, the notches 24 being deep enough so that the upper surface of the lower flange of the angle bars will be flush with the top surface of the bolsters.

The bolsters 22 and 23 are each further provided at two equidistantly spaced points between their two ends with integral plates 25 that are arranged at right angles to the bolsters and project in opposite directions therefrom and that are adapted to have longitudinally disposed angle bars 26 secured thereto, the plates 25 being offset below the plane of the bolster so that the upper surface of the bottom flanges of the angle bars 25 will be flush with the plane of the bolsters. The plates 25 on the front and rear bolsters are braced and supported by integral webs 27 and 28 respectively that add to the strength and rigidity of the bolsters and the angle bars 26 are securely bolted or riveted to the plates 25 so that they form rigid tie and coupling means between the two bolsters thereby eliminating the necessity of a reach rod of the form ordinarily used.

Both the front and rear ends of the angle bars 26 have the horizontal flanges removed for a short distance and the vertical flanges bent at right angles to the bars as at 29 and secured to the front and rear frame cross bars 16 respectively and the angle bars 26 near their rear end rest upon and are secured to a bar 30 that is made fast to the side members 15 and extends crosswise of the frame near the rear end thereof.

Deck planks 31 may be laid between the angle bars 15 and 25 as more clearly shown in Figs. 3 and 4, the two outside deck planks resting on the flanges of the angle bars 15 and 26 and on the bolsters 22 and 23 and the middle deck plank being disposed between the two angle bars 26 and resting on the bolsters 22 and 23. The deck planks may be securely bolted to the truck bolsters thereby further strengthening the frame structure. The angular corner braces 20 make it easy to fit the deck planks to the corners of the frame.

The rear bolster terminates in two tubular brackets 32 that are adapted for the reception of an axle 33. The axle 33 is secured to the bolster bracket 32 by set screws 34 and has truck wheels 35 mounted on the ends thereof. The ends of the bolster brackets 32 serve as thrust bearings for the inner ends of the hubs of the wheels 35 while the thrust of the outer ends of such wheel hubs is borne by caps 36 that fit over the ends of the axle 33 and are secured thereon by key pins 37, see Fig. 5. The axle 33 may be a straight piece of shafting either tubular or solid that is cut to the proper length and has the holes for the key pins 37 drilled in the ends thereof. When the axle becomes worn by the wheels, the set screws 34 may be loosened and the axle turned substantially one half of one complete revolution thereby presenting a new wearing surface. It will be noted that the axle is not weakened by drilling or machining the same in any part that is subjected to load stresses.

The front bolster 22 terminates at its lower end in a circular plate 40 that has a circular recess 41 therein, the said circular recess being surrounded by an annular flange 42 and being adapted for the reception of a cylindrical member 43 on a front axle truss or axle housing 44. The plate 40 and member 43 are centrally perforated for the reception of a king bolt 45 which serves to secure the bolster to the axle housing. The king bolt 45 may be of relatively small diameter owing to the fact that practically all of the shearing stress is borne by the flange 42 and member 43. The plate 40 and the member 43 are large enough to form a substantial bearing surface and support that will not tend to rock from side to side.

The front axle housing 44 terminates at opposite ends in tubular members 46 through which a front axle 47 extends. The front axle 47 is substantially the same as the rear axle 33 hereinbefore described and has wheels 35 mounted thereon in substantially the same manner, the ends of the tubular members 46 serving as thrust bearings for the wheels.

The front axle housing 44 is provided on its front side and adjacent both ends with integral brackets 48 having elongated perforations 50 for the reception of the inwardly bent ends 51 of a tongue 52. The tongue 52 is preferably formed of a single metal bar or rod bent double in such a manner as to leave an eyelet 53 at its outer end, thence twisted together for a short distance as at 54 and thence diverging as shown in Fig. 1, and terminating in the inwardly bent ends 51 which are held in engagement with the brackets 48 by the spring action of the divergent portions of the tongue.

Accidental disengagement of the tongue from the brackets 48 is prevented by lugs 55 that are formed on the bolster housing adjacent the brackets 48 and that have curved surfaces 56 against which the rounded portions that are formed by the inwardly bent ends 51 of the tongue may abut when the tongue is used for resisting a thrust as may occur in backing or stopping the truck.

The rounded surfaces 56 prevent the divergent parts of the tongue from spreading apart as they would otherwise tend to do when the tongue is under compression.

The truck is provided at the rear end and mid way between the two sides with a coupling member 60 having a horizontally arranged flaring or V shaped opening 61 for the reception of the end of the tongue of another truck and having vertically arranged perforations 62 through which a coupling pin may be inserted. The V shaped opening 61 facilitates the insertion of the tongue of the next adjacent truck in the coupling member. The coupling member is securely bolted to both the rear frame bar 16 and the cross bar 30.

The separable corner members 17 make it possible to construct frames of different length and width by using side bars 16 or end bars 17 of different length.

In Figs. 11 and 12 we have shown a modified form of fifth wheel comprising two plates 63 and 64 having a plurality of interfitting circular grooves and flanges that take the greater portion of the shear and side thrust when the device is in operation and make it possible to use a king pin of relatively small size. The plates 63 and 64 in Figs. 11 and 12 are arranged to be bolted to any bolster and axle or axle truss or housing with which they may be used.

This truck is strong and substantial in construction is composed of few parts, and is not expensive to manufacture.

The deck planks are bolted to the bolsters in such a manner that they may be easily removed without disconnecting the frame bars from the bolsters.

The foregoing description and the accompanying drawings disclose a preferred embodiment of the invention but it will be understood that the structure shown is merely illustrative and that such changes in form, shape and dimensions of the device may be resorted to as are within the scope of the claims.

What we claim is:

1. A truck of the class described including longitudinally extending angle bars and cross bolsters notched for the reception of the horizontal flanges of said angle bars whereby the upper surfaces of said flanges and the upper surfaces of said bolsters will be in the same plane.

2. A truck of the class described including parallel spaced apart angle bars, bolsters arranged crosswise of said angle bars and notched for the reception of said angle bars so that the upper surface of the horizontal flanges of said angle bars will be flush with the upper surface of said bolsters and deck planks disposed between said angle bars and arranged to rest on said bolsters and on the horizontal flanges of said angle bars.

3. A truck of the class described comprising front and rear cross bolsters each having their top surface notched adjacent the ends longitudinally extending angle bars arranged to fit within said notches and be secured to said bolsters with the top surface of their horizontal flanges flush with the top surface of said bolsters, integral plates projecting at right angles from said bolsters at intervals throughout the length thereof the top surfaces of said plates being slightly below the plane of the top surface of said bolsters, other angle bars secured to said plates with the top surface of their horizontal flanges flush with the top surface of said bolsters and extending lengthwise of the truck frame parallel with said first named angle bars and deck planks disposed between said angle bars and arranged to rest on said bolsters and on the horizontal flanges of said angle bars.

4. A truck of the class described including a frame, cross bolsters secured to said frame, tubular axle supports connected with said cross bolsters, thrust bearings on the ends of said axle supports and straight cylindrical axles removably and adjustably held in said axle supports.

Signed at Seattle, Washington, this 20th day of December, 1920.

ROY N. ALLEN.
JOHN N. TODD.